B. G. BRAINE.
INSULATED RAIL JOINT.
APPLICATION FILED MAR. 23, 1916.
1,228,645.
Patented June 5, 1917.
2 SHEETS—SHEET 1.
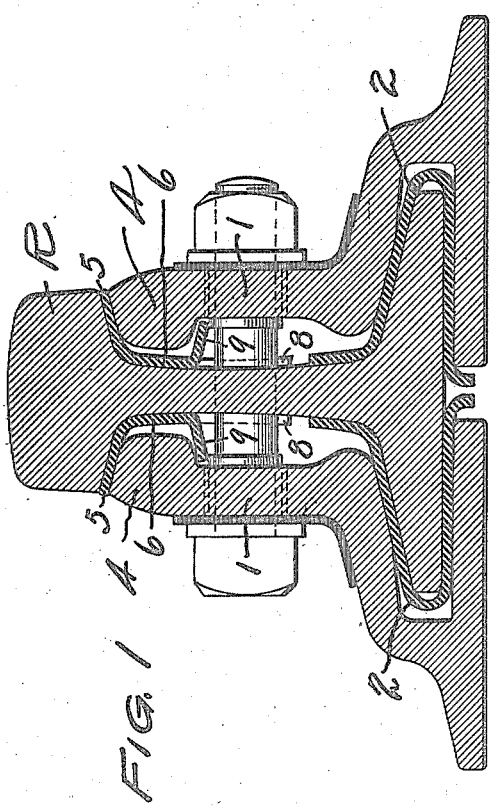
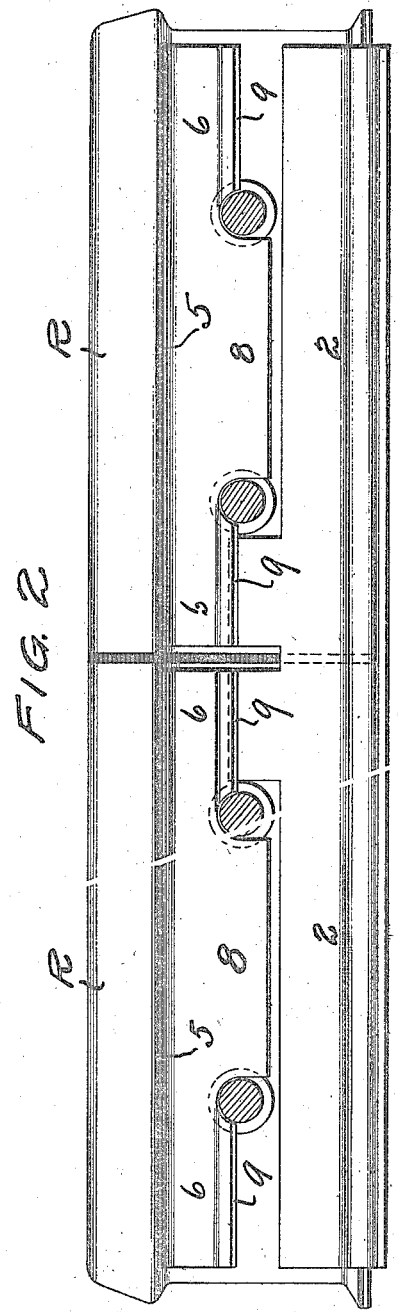
Witness
Emery L. Groff.
Inventor
BANCROFT G. BRAINE
By
Attorney B. G. BRAINE.
INSULATED RAIL JOINT.
APPLICATION FILED MAR. 23, 1916.
1,228,645.
Patented June 5, 1917.
2 SHEETS—SHEET 2.
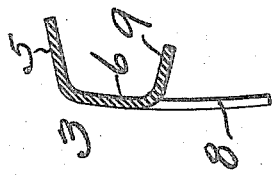
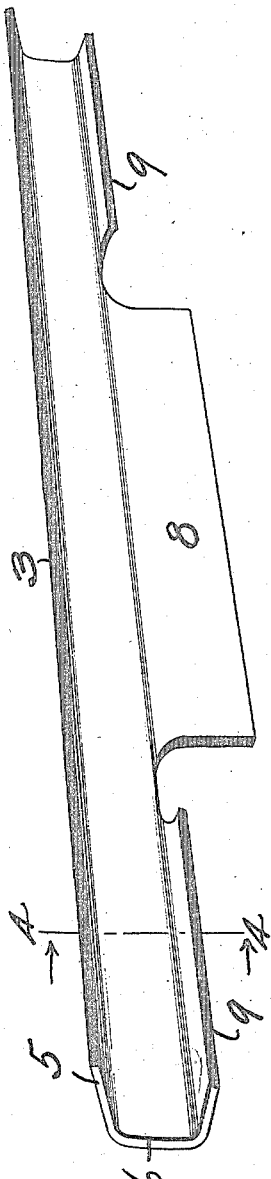
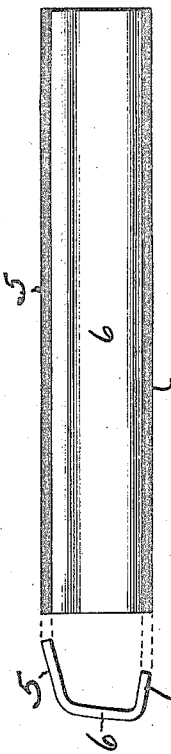
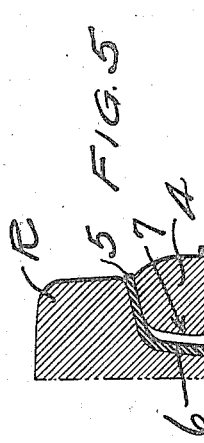
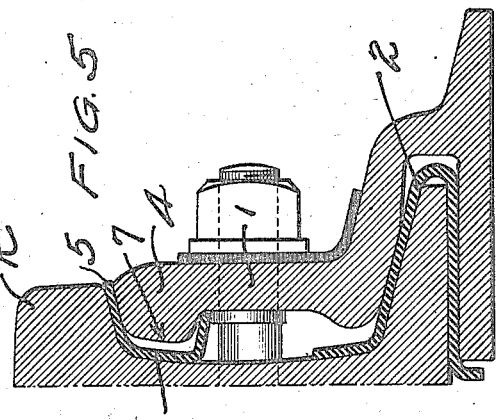
Inventor
BANCROFT G. BRAINE

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

INSULATED RAIL-JOINT.

1,228,645.  Specification of Letters Patent.  Patented June 5, 1917.

Application filed March 23, 1916. Serial No. 86,213.

*To all whom it may concern:*

Be it known that I, BANCROFT G. BRAINE, a citizen of the United States, residing at New York, in the county of New York and State of New York, have invented certain new and useful Improvements in Insulated Rail-Joints, of which the following is a specification.

This invention relates to an improvement in insulation for rail joints of the insulated type, and has special reference to a novel form of insulating unit possessing special utility in its application as the fiber headpiece of divided insulation.

The primary object of the invention is to provide an improvement in the structural form of a rail-head insulating unit, whereby the insulating material may be utilized to provide the most economical conditions of maintenance and renewal. In carrying forward this general object, the invention contemplates a construction wherein that part of the insulation subject to the most rapid disintegration and destruction, may, with certainty, be correctly positioned in the joint regardless of the care of the track men, thereby insuring a proper relative fitting of the insulation and the joint bar against the rail. An improper relative fitting of the insulation and joint bar impairs the ability of the rail-head insulation to successfully resist the destructive forces incident to the pounding of the car wheels in the rail ends as well, as to the tightening of the joint bolts. This improper relative fitting of the parts is frequently due to carelessness of the workmen when applying the joint. That is, with the ordinary form of fiber headpiece of divided insulation, carelessness in application causes the same to assume an oblique or canted position, and it is this faulty position that results in the impairment of the proper fitting of the insulation and joint bar against the rail.

With these and other objects which will be recognized by those familiar with the art, the invention consists in the novel construction, combination, and arrangement of parts hereinafter more fully described, illustrated and claimed.

Though susceptible of structural modifications, and applicable to any form of joint or splice bar, the preferred and practical embodiments of the invention are shown in the accompanying drawings in which:

Figure 1 is a cross sectional view of an insulated rail joint showing the application of the improved rail-head insulating unit thereto, Fig. 2 is a side elevation of the joint with the joint bar removed to thereby expose, in elevation, the improved rail-head insulating unit, Fig. 3 is a detail in perspective of the improved rail-head insulating unit;

Fig. 4 is a detail sectional view of the insulating unit on the line 4—4 of Fig. 3;

Fig. 5 is a bisected sectional view illustrating a modification of the invention wherein the inner depending skirt of the unit is dispensed with, and Fig. 6 is an elevation and projected end view of the modified form of unit shown in Fig. 5.

Similar reference characters designate corresponding parts in the several figures of the drawings.

The improved rail-head insulating unit is applicable to any type of rail joint and to any practical form of joint bar, but for illustrative purposes there is shown in Fig. 1 of the drawings an insulated rail joint, including the usual rails R and joint bars 1 of the continuous type. These joint bars are associated with any suitable form of base insulation 2 which insulates the bars from the rail flanges, but the rail-head insulation is the novel and distinctive feature of the invention.

The said rail-head insulation consists of an insulation plate 3, of fiber or equivalent insulating material, and said plate comprises an angle member fitting in the angle of the rail beneath the rail head, and engaged by the head portion 4 of the joint bar. The angular insulation plate includes an upper insulating flange 5, which is clamped between the under side of the rail-head and the upper side of the joint bar. It also includes the inner depending web portion 6, which lies between the inner head projection 7 of the joint bar and the web of the rail.

In the form of the invention, illustrated in Figs. 1 to 4 inclusive of the drawings, the insulation plate 3 is also usually formed with a depending skirt portion 8, extending between the joint bolts and serving to prevent longitudinal creeping or displacement of the insulating unit. But, in all embodiments of the invention the insulation plate 3, is provided with side guard projections 9. These guard projections may be made in different ways, and may assume different forms, though in the preferred embodiment shown the same are provided by bending outwardly the end portions of the inner web 6, of the insulation plate, thus producing outturned flanges which underlie the inner side projection 7 of the head of the bar, and are adapted to engage against the inner side of the bar. By reason of the construction described it will be apparent that when the rail-head insulating unit, or fiber head-piece, is inserted between the rail and the joint bar the guard projections or flanges 9, will abut against the inner face of the bar and thereby prevent the unit or head-piece from assuming the canted or oblique position previously referred to. Thus, the improvement insures a correct relative fitting of the insulation and joint parts with the result of holding the insulating unit in its most effective position.

By way of illustrating the range of modification that may be resorted to in carrying out the invention there is shown in Figs. 5 and 6 of the drawings a construction wherein the skirt portion of the insulation plate is entirely dispensed with, and the outturned guard projection or flange 9ª is in the form of a continuous flange, thereby producing an insulating unit substantially in the form of a cuff fitting over the upper side and inner head projection of the joint bar.

From the foregoing, it is thought that the construction and advantages of the improved rail-head insulating unit will be apparent without further description, and it will be understood that changes in the form, proportion and minor details of construction may be resorted to without departing from the spirit or sacrificing any of the advantages of the invention.

I claim:

1. In combination with a rail and the joint bar of a rail head insulating unit comprising an insulation plate lying beneath the rail head and having a guard projection adapted to engage the inner side of the bar.

2. A rail head insulating unit comprising an insulation plate shaped to fit the head portion of the joint bar beneath the rail head and provided with an outturned guard flange adapted to abut against the joint bar.

3. A rail-head insulating unit comprising an insulation plate having an upper outturned insulating flange and a depending web portion formed with an outturned guard flange.

4. A rail-head insulating unit comprising an insulation plate having an upper insulating flange and a depending web formed with a depending skirt and with an outturned guard flange.

5. A rail-head insulating unit comprising an insulation plate provided with an upper insulating flange and with a web portion having a central skirt extension and outturned guard flanges at its ends.

In testimony whereof I hereunto affix my signature in the presence of two witnesses.

BANCROFT G. BRAINE.

Witnesses:
  E. K. KERSHNER,
  C. A. DISBROW.